Patented July 20, 1948

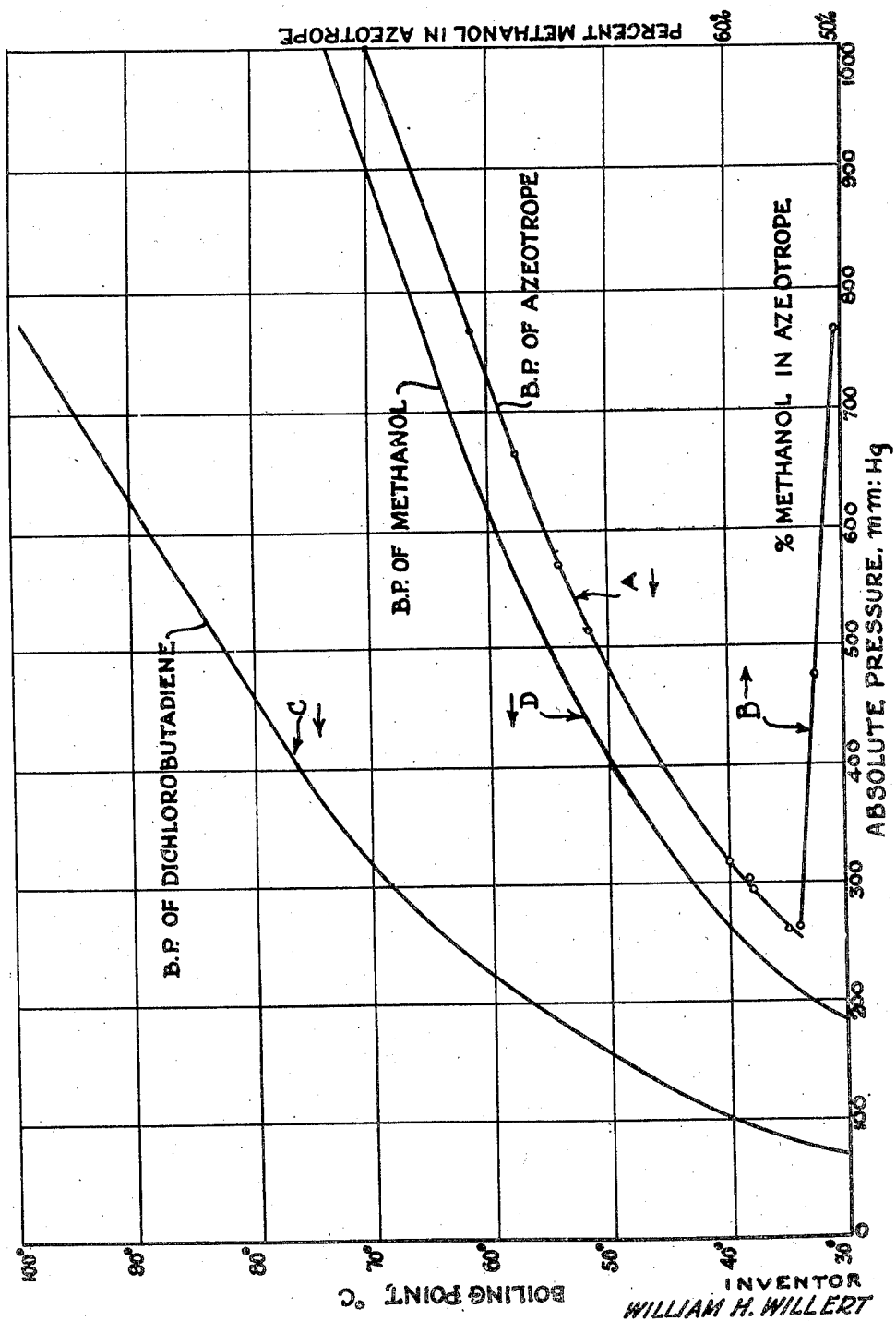

2,445,738

UNITED STATES PATENT OFFICE 2,445,738

DISTILLATION OF 2,3-DICHLORO-BUTADIENE-1,3

William H. Willert, Clifton, N. J., assignor to The Firestone Tire & Rubber Company, Akron, Ohio, a corporation of Ohio Application June 26, 1947, Serial No. 757,300

7 Claims. (Cl. 260—655)

This invention relates to the distillation of 2,3-dichlorobutadiene-1,3, hereinafter designated, for brevity, dichlorobutadiene.

Dichlorobutadiene may conveniently be prepared by the caustic or pyrolytic dehydrohalogenation of 1,2, 3,4-tetrachlorobutane or of 1,2,3-trichlorobutene-3. The products obtained from these reactions are difficult to purify by distillation, as they contain substantial amounts of impurities boiling at approximately the same temperature as dichlorobutadiene. The purification of dichlorobutadiene is still further complicated by its relative non-volatility, which necessitates employment of such high distillation temperatures that the dichlorobutadiene is polymerized to a considerable extent during any distillation conducted thereon. Vacuum distillation would be disadvantageous in that special cooling media would be required for the condensers.

Accordingly it is an object of this invention to separate dichlorobutadiene from reaction masses in which it is produced.

Another object is to effect such separation at relatively low temperatures.

A further object is to effect such separation by a distillation process.

The applicant (patentee) has discovered that dichlorobutadiene forms abnormally low boiling mixtures with methanol, the optimum, or azeotropic, mixtures boiling approximately 35° C. below the boiling point of dichlorobutadiene, and several degrees below the boiling point of methanol, at any given pressure. These mixtures are formed over all realizeable ranges of temperature, independently of the presence of any impurities ordinarily associated with dichlorobutadiene. The applicant's invention therefore consists in distilling impure dichlorobutadiene through a fractionating column in the presence of sufficient methanol to form, with the dichlorobutadiene, low boiling mixtures having compositions in the neighborhood of the azeotropic composition. The resultant lowering of distillation temperatures both minimizes polymerization of the dichlorobutadiene and also enables the separation thereof from impurities having boiling points close to that of dichlorobutadiene.

The invention will be more particularly described in connection with the accompanying drawing, which is a graph showing the boiling points of azeotropic combinations of dichlorobutadiene and methanol at various pressures, and the compositions thereof.

The distillation process of this invention may enter into the manufacture of dichlorobutadiene in various ways. For instance, the products from continuous or discontinuous caustic or pyrolytic dehydrohalogenation of 1,2,3,4-tetrachlorobutane or of 1,2,3-trichlorobutene-3 may be fed to the central zone of a distillation column operating in accordance with conditions set forth below. Vapors of purified dichlorobutadiene and methanol, more or less approaching the azeotropic composition, will be discharged from the top of the column, and impurities and excess methanol will be discharged at the bottom. Heat will, of course, be supplied at the bottom, and reflux at the top, of the column. An alternative arrangement involves the caustic dehydrohalogenation of tetrachlorobutane or trichlorobutene in the presence of methanol in a still-pot venting through a fractionating column, which column is operated with suitable reflux to obtain the distillation conditions of this invention, as more particularly brought out hereinbelow. Such arrangement has the advantage of utilizing the heat of reaction to effect the distillation. Still another modification involves the injection, into the central sections of a fractionating column, of materials capable of reacting to produce dichlorobutadiene, together with appropriate quantities of methanol. A low-boiling dichlorobutadiene-methanol vapor mixture will be vented through the top of the column, and any water, low boiling materials, non-volatile materials, etc. will be rejected as bottoms. Heat and reflux are appropriately supplied.

Referring now to the conditions under which the distillation according to this invention should be conducted, and first to the amount of methanol which should be supplied to the column along with the dichlorobutadiene, it will be noted from the drawing (curve A) and demonstrated hereafter in Example I, that the azeotropic dichlorobutadiene-methanol compositions depart, with variations in temperature, only slightly from about 50% methanol, based on the total weight of dichlorobutadiene and methanol. (Hereinafter, all percentages will be expressed on the basis of combined weight of dichlorobutadiene and methanol.) Accordingly, if at any time the concentration of methanol, at or above the point where the dichlorobutadiene enters the system, drops below 50% (i. e., operating conditions become hypoazeotropic), it will be necessary to introduce additional quantities of methanol in order to recover all of the dichlorobutadiene. Moreover, since the boiling point of dichlorobutadiene-methanol compositions rises rapidly as the proportion of methanol therein decreases, the concentration of methanol should be maintained at least above about 30% to avoid heat-induced polymerization. While it is possible, as just stated, to operate at least temporarily with hypo-azeotropic compositions, it is preferred to maintain the concentration of methanol in excess of 50% at all sections of the apparatus above the point of introduction of the dichlorobutadiene. Advantages of hyper-azeotropic operating conditions are, inter alia, that the boiling point of the mixtures is not greatly elevated by even large excesses of methanol. Moreover, the methanol dilutes the dichlorobutadiene, reducing its tendency to polymerize. Still further, the methanol forms a barrier, in the distillation apparatus, between the high boiling impurities left at the bottom of the column and the low-boiling dichlorobutadiene-methanol mixture evolved at the top of the column. The only objection to the use of extremely large quantities of methanol is the greater dilution of the distillate with any given height of fractionating column. Theoretically, indefinitely large proportions of methanol might be used, since the temperature would never rise above the boiling point of methanol, at which temperature the polymerization rate of the monomer would be very low.

Referring next to the geometry of the distillation column, the distilland-distillate line is sufficiently curved so that relatively rapid separation is effected, the distillate generally approaching substantially to the azeotropic composition with the use of a column equivalent (above the point of entry of dichlorobutadiene) to about five theoretical plates under the selected rate of throughput. It is preferred and safer to employ a column affording a separation equivalent to about 10 or 15 theoretical plates. Longer columns may be used but are usually unnecessary. The reflux column may of any type, preferably a simple tower packed with glass fiber, which fiber may be removed and discarded when it eventually becomes clogged with polymerized dichlorobutadiene.

The top of the column is maintained at a temperature from about 0.5° to about 3.0° C. below the boiling point of pure methanol under the pressure reigning in the column. Specifically, when the pressure is atmospheric, the top of the column is maintained between about 64° and about 61.5° C. This regulation is obtained either by abstraction of heat from the column, or by reflux of total or partial condensate from the discharged vapor. Temperatures higher than 0.5° C. below the boiling point of pure methanol indicate either (1) insufficient reflux to maintain fractionating conditions throughout the column, (2) in the case of operation under hyper-azeotropic conditions, exhaustion of the distilland to an unprofitable extent and consequent danger of carrying over undesired constituents or (3) in the case of operation under hypo-azeotropic conditions, an unduly low concentration of methanol at some point in the apparatus. In the case of such excessive temperatures, the cause may readily be determined and remedied or, in case (2) above, distillation discontinued.

With the foregoing general discussion in mind, there are given herewith detailed examples of the practice of this invention. All percentages in the case of dichlorobutadiene-methanol mixtures are given on the basis of the combined weight of dichlorobutadiene and methanol. All parts given are by weight.

EXAMPLE I

COMPOSITION AND BOILING POINT OF THE DICHLOROBUTADIENE-METHANOL AZEOTROPE AT VARIOUS PRESSURES

The apparatus for this determination comprised a 1-liter round-bottom flask provided with a heating mantle. The flask was surmounted by a 5-foot jacketed column packed with glass beads and provided at its top with a thermometer and with a reflux condenser arranged to return all but a minor proportion of its condensate as reflux to the column. The whole system was sealed off from the atmosphere, and connections provided to vary the pressure within the system.

A series of runs was made at various pressures to determine the composition and boiling points of azeotropic mixtures at various pressures. In each case, a dichlorobutadiene-methanol mixture containing 50% methanol was placed in the flask, the system adjusted to the pressure selected for that run, and heat applied to the flask to initiate distillation at a moderate rate. The reflux was adjusted to give almost total reflux. When a steady state had been attained, the temperature at the top of the column was read, and a sample of the distillate taken and analyzed. Set forth in the table are the pressures at which the runs were made, together with the boiling points and compositions of the azeotropic compositions at those pressures.

*Table*

| Pressure (mm. Hg Abs.) | Azeotrope | |
|---|---|---|
| | Boiling Point, °C. | Percent Methanol |
| 1000 | 70.0 | |
| 760 | 61.5 | 50.0 |
| 660 | 58.0 | |
| 575 | 54.5 | |
| 515 | 51.5 | |
| 475 | 50.0 | 52.0 |
| 315 | 40.0 | |
| 305 | 39.0 | |
| 290 | 38.0 | |
| 275 | 36.0 | 53.5 |

These data are plotted in the graph of the drawing, curve A showing the variation of the boiling point (left-hand scale) of the azeotrope with pressure, and curve B showing the variation of composition (right-hand scale) with pressure. Likewise shown on the graph are curves C and D showing the variation of the boiling points (left-hand scale) of dichlorobutadiene and of methanol respectively. It will be seen that under any given pressure the dichlorobutadiene-methanol azeotrope boils far lower than dichlorobutadiene, being consistently about 3.0 C. degrees below the boiling point of pure methanol. Likewise it will be seen that the azeotropic composition departs only slightly from 50% methanol content with changes in pressure.

EXAMPLE II

DISTILLATION OF DICHLOROBUTADIENE FROM REACTION MASS

| | Pounds |
|---|---|
| A { Tetrachlorobutane | 112 |
| { Methanol | 225 |
| Sodium hydroxide (50% aqueous) | 118 |

The apparatus for this example comprised a 65-gallon still pot provided with a heating and cooling jacket and surmounted by a reflux column. This column comprised a tower 4" in diameter and 40" in height, packed with vertically arranged glass fibers ("Fiberglas," basis fiber No. 800, manufactured by the Owens-Corning Corp.; total weight of fiber in tower 2 lb). The column was provided at the top with a partial condenser, arranged to reflux its condensate to the column, and a final condenser arranged to condense and divert as product the vapors passing the partial condenser.

The ingredients listed at "A" were charged into the still pot and the sodium hydroxide was then fed into the still pot at a rate such that the vapors evolved by the heat of reaction had a velocity of 5 feet per second in the column. The partial condenser was adjusted to provide a reflux ratio of 2.4/1 (reflux/total material removed from column). Under these conditions, it is estimated that the column provided a separation equivalent to 10 theoretical plates. During most of the run, the temperature at the top of the column remained steady at 62.5° C., the discharged distillate comprising about 50% by weight dichlorobutadiene. Toward the end of the run, heat was supplied to the still pot, and the temperature of the vapors at the top of the column gradually rose to 63.5° C., at which point the reaction was discontinued. The distillate recovered from the final condenser was mixed with water to effect separation of the dichlorobutadiene therefrom. The yield of dichlorobutadiene was 73.7% or 60% of the theoretical.

EXAMPLE III

CONTINUOUS AZEOTROPIC DISTILLATION OF DICHLOROBUTADIENE

The apparatus for this example comprised a plain tower 10' high and 6" in diameter, having a condenser at the top arranged to reflux a regulated portion of the distillate; having a feed pipe and distributing plate at a point 6' from the top; and having a reboiler section at the bottom. The tower was packed with "Fiberglas," basic fiber No. 800, vertically arranged at a density of 2.5 lb. per cubic foot.

A chlorobutadiene-methanol mixture from a reaction mass comprising:

| | Per cent |
|---|---|
| Dichlorobutadiene | 17 |
| Methanol | 53 |
| Water | 20 |
| Miscellaneous organic impurities | 10 | was introduced through the feed pipe into the column. Steady conditions of operation were as follows:

| | |
|---|---|
| Reaction mass fed to center of column | 200#/hr. |
| Reflux ratio (reflux/distillate taken out of system) | 2.4/1 |
| Temperature at top of column | 62.5° C. |
| Temperature at reboiler | 75° C. |

The distillate comprised a dichlorobutadiene-methanol mixture containing 51% methanol. The dichlorobutadiene recovered from the distillate by dilution with water comprised 93% of the dichlorobutadiene entering the feed.

From the foregoing general discussion and detailed specific examples, it will be evident that this invention provides a means for the purification of dichlorobutadiene which may be expeditiously carried out in simple and inexpensive equipment. The recovery of dichlorobutadiene is excellent. The methanol employed is cheap, and may moreover be readily recovered from the bottoms and from the water solution resulting from the treatment of the distillate with water, since methanol may be completely separated from water by fractionation.

What is claimed is:

1. Process which comprises distilling a mixture containing 2,3-dichlorobutadiene-1,3 and methanol through a fractionating column, maintaining the temperature at the top of the column between about 0.5° and about 3.0° C. below the boiling point of pure methanol under the pressure reigning in the column, and maintaining, at each section of the column, a concentration of at least about 30% of methanol, based upon the total weight of 2,3-dichlorobutadiene-1,3 and of methanol at that section.

2. Process which comprises distilling a mixture containing 2,3-dichlorobutadiene-1,3 and methanol through a fractionating column, maintaining the temperature at the top of the column between about 0.5° and about 3.0° C. below the boiling point of pure methanol under the pressure reigning in the column, and maintaining, at each section of the column, a concentration of at least about 50% of methanol, based upon the total weight of 2,3-dichlorobutadiene-1,3 and of methanol at that section.

3. Process which comprises feeding, to the intermediate portion of a distillation column, 2,3-dichlorobutadiene-1,3 and at least 50% of methanol based on the total weight of 2,3-dichlorobutadiene-1,3 and methanol, maintaining the temperature at the top of the column between about 0.5° C. and about 3.0° C. below the boiling point of pure methanol under the pressure reigning in the column, withdrawing vapors at the top of the column supplying heat at the bottom of the column, and removing excess material at the bottom of the column.

4. Process which comprises reacting together tetrachlorobutane and a caustic dehydrohalogenating agent in the presence of at least 50% of methanol, based on the total weight of 2,3-dichlorobutadiene-1,3 produced and of methanol, conducting the vapors resulting from the heat of reaction through a fractionating column, maintaining the top sections of the column between about 0.5° and about 3.0° C. below the boiling point of pure methanol under the pressure reigning in the column, and withdrawing vapors at the top of the column.

5. Process which comprises distilling a mixture containing 2,3-dichlorobutadiene-1,3 and methanol through a fractionating column, maintaining the pressure in the column substantially at atmospheric, maintaining the temperature at the top of the column between about 61.5° and about 64° C., and maintaining, at each section of the column, a concentration of at least about 50% of methanol, based upon the total weight of butadiene and of methanol at that section.

6. Process which comprises feeding, to the intermediate portion of a distillation column, 2,3-dichlorobutadiene-1,3 and at least 50% of methanol based on the total weight of 2,3-dichlorobutadiene-1,3 and methanol, maintaining the pressure within the column substantially at atmospheric, maintaining the temperature at the top of the column between about 61.5° and about 64° C., withdrawing vapors at the top of the column supplying heat at the bottom of the column, and removing excess material at the bottom of the column.

7. Process which comprises reacting together tetrachlorobutane and a caustic dehydrohalogenating agent in the presence of at least 50% of methanol, based on the total weight of 2,3-dichlorobutadiene-1,3 produced and of methanol, conducting the vapors evolved by the heat of reaction through a fractionating column, maintaining the pressure in the column substantially at atmospheric, maintaining the top sections of the column between about 61.5° and about 64° C., and withdrawing vapors at the top of the column.

WILLIAM H. WILLERT.

REFERENCES CITED

The following references are of record in the file of this patent:

UNITED STATES PATENTS

| Number | Name | Date |
|---|---|---|
| 1,998,442 | Carothers | Apr. 23, 1935 |
| 2,180,115 | Lange et al. | Nov. 14, 1939 |
| 2,341,433 | Fisher | Feb. 8, 1944 |
| 2,356,785 | Hammond | Aug. 29, 1944 |
| 2,397,653 | Erickson | Apr. 2, 1946 |